United States Patent
Johns et al.

(10) Patent No.: US 12,006,870 B2
(45) Date of Patent: Jun. 11, 2024

(54) HEAT EXCHANGER FOR AN AIRCRAFT

(71) Applicant: General Electric Company, Schenectady, NY (US)

(72) Inventors: Matthew Ryan Johns, Centerville, OH (US); Alex William Ariapad, Cincinnati, OH (US); Nicolas Kristopher Sabo, Liberty Township, OH (US); Jeffrey Douglas Rambo, Mason, OH (US); Ramon Martinez, Fairfield, OH (US); Jared Wolfe, West Chester, OH (US)

(73) Assignee: General Electric Company, Schenectady, NY (US)

( * ) Notice: Subject to any disclaimer, the term of this patent is extended or adjusted under 35 U.S.C. 154(b) by 167 days.

(21) Appl. No.: 17/117,336

(22) Filed: Dec. 10, 2020

(65) Prior Publication Data
US 2022/0186664 A1    Jun. 16, 2022

(51) Int. Cl.
*F02C 7/14*         (2006.01)

(52) U.S. Cl.
CPC .......... *F02C 7/14* (2013.01); *F05D 2220/323* (2013.01); *F05D 2260/213* (2013.01); *F05D 2260/606* (2013.01)

(58) Field of Classification Search
CPC .............. F28D 2021/0021; F28F 27/02; F28F 2250/06; F28F 19/006; F25D 2021/0021;
(Continued)

(56) References Cited

U.S. PATENT DOCUMENTS 2,469,028 A    5/1949   Belaieff
2,656,159 A    10/1953   Holm et al.
(Continued)

FOREIGN PATENT DOCUMENTS

DE           966473 C      9/1957
DE        19653989 A1    6/1998
(Continued)

OTHER PUBLICATIONS

3D Numerical Simulation of turbulent flow and heat transfer in a U-tube of different configurations; Khudheyer S. M., Ayad Ali M; International Journal of Engineering and Technology; 2018.*

*Primary Examiner* — Todd E Manahan
*Assistant Examiner* — Rodolphe Andre Chabreyrie
(74) *Attorney, Agent, or Firm* — Dinsmore & Shohl LLP

(57) ABSTRACT

A heat exchanger for an aircraft includes an inlet plenum housing defining an inlet plenum configured to receive a fluid and an outlet plenum housing defining an outlet plenum configured to discharge the fluid. Furthermore, the heat exchanger includes a core configured to heat or cool a first portion of the fluid, with the core defining a plurality of fluid passages extending from the inlet plenum to the outlet plenum. Moreover, the heat exchanger includes a passive bypass defining a passive bypass flow path fluidly coupled to and extending between the inlet plenum and the outlet plenum. As such, the passive bypass flow path is in parallel with at least a portion of the core such that a second portion of the fluid bypasses at least a portion of the core and flows continuously and unobstructed through the passive bypass flow path to the outlet plenum.

11 Claims, 11 Drawing Sheets

(58) Field of Classification Search
CPC .............. F02C 7/14; F05D 2260/213; F05D 2260/606; F05D 2220/323
See application file for complete search history.

(56) References Cited

U.S. PATENT DOCUMENTS

| | | | |
|---|---|---|---|
| 3,118,489 A | 1/1964 | Bergdoll et al. | |
| 3,272,260 A | 9/1966 | Raub et al. | |
| 3,460,611 A | 8/1969 | Folsom et al. | |
| 3,920,067 A | 11/1975 | Schindler et al. | |
| 4,086,956 A * | 5/1978 | Block | F28F 27/02 236/12.13 |
| 4,209,062 A | 6/1980 | Woodhull, Jr. | |
| 4,256,172 A | 3/1981 | Rahnke et al. | |
| 4,265,302 A | 5/1981 | Forster et al. | |
| 4,271,110 A | 6/1981 | Minjolle | |
| 4,343,355 A | 8/1982 | Goloff et al. | |
| 4,746,479 A | 5/1988 | Hanaki et al. | |
| 4,811,719 A | 3/1989 | Baumann | |
| 4,958,681 A | 9/1990 | Kadle | |
| 5,458,187 A | 10/1995 | Davis | |
| 5,575,329 A | 11/1996 | So et al. | |
| 5,590,708 A | 1/1997 | Ulrich | |
| 5,775,412 A | 7/1998 | Montestruc, III et al. | |
| 5,875,834 A | 3/1999 | Brooks | |
| 6,167,956 B1 | 1/2001 | Bostedo et al. | |
| 6,460,598 B1 | 10/2002 | Adams et al. | |
| 6,668,912 B2 | 12/2003 | Adams et al. | |
| 6,793,012 B2 | 9/2004 | Fang et al. | |
| 7,285,153 B2 | 10/2007 | Bruun et al. | |
| 7,610,949 B2 | 11/2009 | Palanchon | |
| 7,735,546 B2 | 6/2010 | Bird et al. | |
| 8,051,902 B2 | 11/2011 | Kappes et al. | |
| 8,211,377 B2 | 7/2012 | Caze et al. | |
| 8,228,675 B2 | 7/2012 | Koplow | |
| 8,240,365 B2 | 8/2012 | Obana et al. | |
| 8,387,362 B2 * | 3/2013 | Storage | F02K 3/115 60/266 |
| 8,770,269 B2 | 7/2014 | Scott | |
| 8,857,503 B2 | 10/2014 | Magill et al. | |
| 9,658,005 B2 | 5/2017 | Elder | |
| 9,732,702 B2 | 8/2017 | Ueda | |
| 10,345,057 B2 | 7/2019 | Storage et al. | |
| 11,623,200 B2 * | 4/2023 | Rudolph | C12M 41/22 435/297.1 |
| 2004/0131512 A1 | 7/2004 | Abe et al. | |
| 2004/0261379 A1 | 12/2004 | Bruun et al. | |
| 2005/0161203 A1 | 7/2005 | Fang et al. | |
| 2009/0255650 A1 * | 10/2009 | Magill | F28F 27/02 165/103 |
| 2011/0268583 A1 | 11/2011 | Bunker | |
| 2013/0174924 A1 | 7/2013 | Luo et al. | |
| 2013/0206374 A1 | 8/2013 | Roisin et al. | |
| 2013/0306288 A1 | 11/2013 | Taras et al. | |
| 2014/0140829 A1 | 5/2014 | Blair et al. | |
| 2014/0202663 A1 | 7/2014 | Shea | |
| 2015/0007969 A1 | 1/2015 | Pal | |
| 2016/0003552 A1 | 1/2016 | Chordia et al. | |
| 2016/0054071 A1 | 2/2016 | Cordova et al. | |
| 2016/0131434 A1 | 5/2016 | Noishiki et al. | |
| 2016/0131441 A1 | 5/2016 | Newman et al. | |
| 2016/0131443 A1 | 5/2016 | Oliva et al. | |
| 2016/0178287 A1 | 6/2016 | Karlen et al. | |
| 2017/0089643 A1 | 3/2017 | Arafat | |
| 2017/0198976 A1 | 7/2017 | Turney et al. | |
| 2017/0205146 A1 | 7/2017 | Turney et al. | |
| 2017/0292791 A1 | 10/2017 | Zaffetti et al. | |
| 2018/0038654 A1 | 2/2018 | Popp et al. | |
| 2018/0087852 A1 * | 3/2018 | Storage | F28D 1/0233 |
| 2018/0128559 A1 | 5/2018 | Deacon et al. | |
| 2019/0086163 A1 | 3/2019 | Pollard et al. | |
| 2019/0390915 A1 * | 12/2019 | St. Rock | F28F 21/065 |

FOREIGN PATENT DOCUMENTS

| | | |
|---|---|---|
| GB | 2501413 A | 10/2013 |
| JP | 2006-064246 A | 3/2006 |
| WO | WO2016-057443 A1 | 4/2016 |

* cited by examiner

HEAT EXCHANGER FOR AN AIRCRAFT

FIELD

The present subject matter relates to aircraft and, more particularly, to heat exchangers for an aircraft or an associated gas turbine engine.

BACKGROUND

A turbofan engine generally includes a fan, a compressor section, a combustion section, and a turbine section. More specifically, the fan generates a flow of pressurized air. A portion of this air flow is used as propulsive thrust for propelling an aircraft, while the remaining air is supplied to the compressor section. The compressor section, in turn, progressively increases the pressure of the received air and supplies this compressed air to the combustion section. The compressed air and a fuel mix within the combustion section and burn within a combustion chamber to generate high-pressure and high-temperature combustion gases. The combustion gases flow through the turbine section before exiting the engine. In this respect, the turbine section converts energy from the combustion gases into rotational energy. This rotational energy, in turn, is used to drive the compressor section and/or the fan via various shaft and/or gearboxes.

Typically, a turbofan engine includes various heat exchangers to heat or cool the fluids that support the operation of the engine and/or the associated aircraft. For example, the engine may include one or more heat exchangers that cool the oil circulated through the gearbox(es) of the engine.

In general, there is a trade-off between the pressure drop of the fluid flowing through the heat exchanger and the heat transfer from or to such fluid. More specifically, as the amount of heat transfer to or form the fluid flowing through the heat exchanger increases, so does the pressure drop across the heat exchanger. As such, it typically necessary to increase the size and the weight of the heat exchanger to keep the pressure drop under a maximum value while maintaining a minimum heat transfer rate. Increased heat exchanger size and weight may negatively impact the performance or efficiency of gas turbine engines and/or aircraft.

Accordingly, an improved heat exchanger for an aircraft or an associated gas turbine engine would be welcomed in the technology.

BRIEF DESCRIPTION

Aspects and advantages of the invention will be set forth in part in the following description, or may be obvious from the description, or may be learned through practice of the invention.

In one aspect, the present subject matter is directed to a heat exchanger for an aircraft. The heat exchanger includes an inlet plenum housing defining an inlet plenum configured to receive a fluid and an outlet plenum housing defining an outlet plenum configured to discharge the fluid from the heat exchanger. Furthermore, the heat exchanger includes a core configured to heat or cool a first portion of the fluid, with the core defining a plurality of fluid passages fluidly coupled to and extending from the inlet plenum to the outlet plenum. Moreover, the heat exchanger includes a passive bypass defining a passive bypass flow path fluidly coupled to and extending between the inlet plenum and the outlet plenum. As such, the passive bypass flow path is in parallel with at least a portion of the core such that a second portion of the fluid bypasses at least a portion of the core and flows continuously and unobstructed through the passive bypass flow path to the outlet plenum.

In another aspect, the present subject matter is directed to a gas turbine engine. The gas turbine engine includes a compressor, a combustor, a turbine, and a heat exchanger in operative association with at least one of the compressor, the combustor, or the turbine. The heat exchanger, in turn, includes an inlet plenum housing defining an inlet plenum configured to receive a fluid and an outlet plenum housing defining an outlet plenum configured to discharge the fluid from the heat exchanger. Additionally, the heat exchanger includes a core configured to heat or cool a first portion of the fluid, with the core defining a plurality of fluid passages fluidly coupled to and extending from the inlet plenum to the outlet plenum. Furthermore, the heat exchanger includes a passive bypass defining a passive bypass flow path fluidly coupled to and extending between the inlet plenum and the outlet plenum. In this respect, the passive bypass flow path being in parallel with at least a portion of the core such that a second portion of the fluid bypasses at least a portion of the core and flows continuously and unobstructed through the passive bypass flow path to the outlet plenum.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
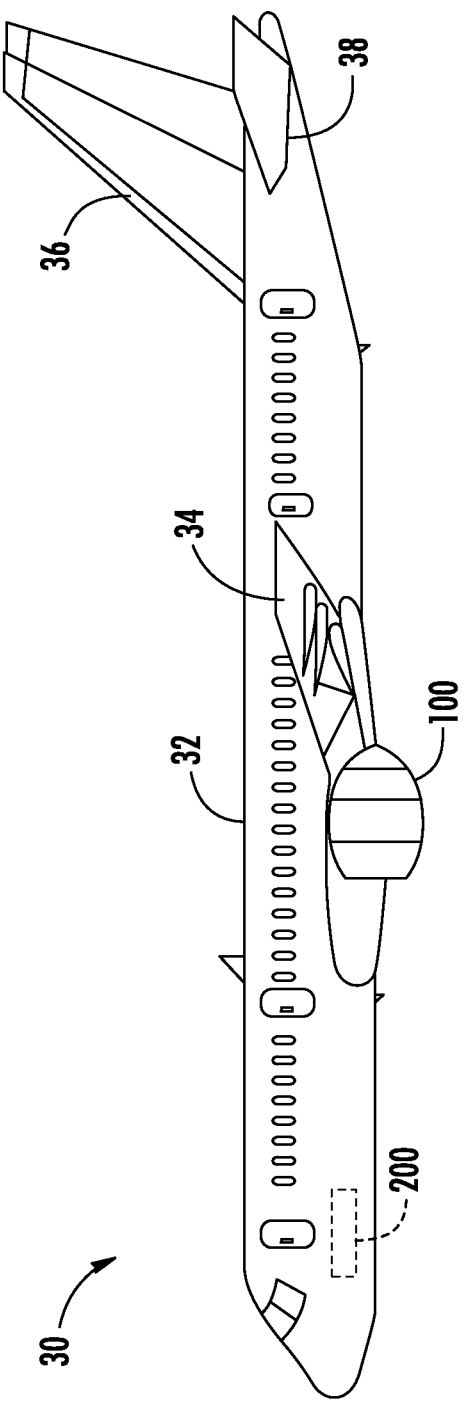
FIG. 1 is a side view of one embodiment of an aircraft.

Repeat use of reference characters in the present specification and drawings is intended to represent the same or analogous features or elements of the present invention.

DETAILED DESCRIPTION

Reference now will be made in detail to exemplary embodiments of the presently disclosed subject matter, one or more examples of which are illustrated in the drawings. Each example is provided by way of explanation and should not be interpreted as limiting the present disclosure. In fact, it will be apparent to those skilled in the art that various modifications and variations can be made in the present disclosure without departing from the scope or spirit of the present disclosure. For instance, features illustrated or described as part of one embodiment can be used with another embodiment to yield a still further embodiment. Thus, it is intended that the present disclosure covers such modifications and variations as come within the scope of the appended claims and their equivalents.

As used herein, the terms "first", "second", and "third" may be used interchangeably to distinguish one component from another and are not intended to signify location or importance of the individual components.

Furthermore, the terms "upstream" and "downstream" refer to the relative direction with respect to fluid flow in a fluid pathway. For example, "upstream" refers to the direction from which the fluid flows, and "downstream" refers to the direction to which the fluid flows.

Additionally, the terms "low," "high," or their respective comparative degrees (e.g., lower, higher, where applicable) each refer to relative speeds within an engine, unless otherwise specified. For example, a "low-pressure turbine" operates at a pressure generally lower than a "high-pressure turbine." Alternatively, unless otherwise specified, the aforementioned terms may be understood in their superlative degree. For example, a "low-pressure turbine" may refer to the lowest maximum pressure turbine within a turbine section, and a "high-pressure turbine" may refer to the highest maximum pressure turbine within the turbine section.

In general, the present subject matter is directed to a heat exchanger for an aircraft or an associated gas turbine engine. As will be described below, the heat exchanger may be configured to transfer heat between two or more fluids supporting the operation of the engine and/or the aircraft. For example, the heat exchanger may be configured to transfer heat between the oil lubricating the engine and the fuel supplied to the engine. In several embodiments, the heat exchanger includes an inlet plenum housing defining an inlet plenum configured to receive a fluid and an outlet plenum housing defining an outlet plenum configured to discharge the fluid from the heat exchanger. Furthermore, the heat exchanger includes a core configured to heat or cool a first portion of the fluid. As such, the core defines a plurality of fluid passages fluidly coupled to and extending from the inlet and outlet plena.

Additionally, the heat exchanger includes a passive bypass. Specifically, in several embodiments, the passive bypass defines a passive bypass flow path fluidly coupled to and extending between the inlet and outlet plena. Moreover, the passive bypass flow path is in parallel with at least a portion of the core. As such, during operation of the heat exchanger, a fluid enters the inlet plenum. A first portion of this fluid flows through the fluid passages of the core to the outlet plenum, thereby allowing heat to be transferred to or from this portion of the fluid. Furthermore, a second portion of the fluid entering the inlet plenum bypasses at least a portion of the core and flows continuously and unobstructed through the passive bypass flow path to the outlet plenum. Thus, the passive bypass flow path is completely devoid of valves or other devices that selectively occlude the flow of fluid therethrough.

The passive bypass of the heat exchanger provides one or more technical advantages. More specifically, as mentioned above, conventional heat exchangers are generally oversized to maintain the desired heat transfer rate while keeping the pressure drop under a threshold value. Such an oversized heat exchanger add weight to the gas turbine engine and/or aircraft on which it is installed. However, the passive bypass allows a portion of the fluid to bypass the core continuously and in an unobstructed manner (i.e., without being controlled by a valve(s)), thereby keeping the pressure drop of the fluid across the heat exchanger under a threshold value while maintaining a sufficient heat transfer rate. Thus, the passive bypass allows the disclosed heat exchanger to be smaller and lighter than conventional heat exchangers, thereby reducing the overall weight of the gas turbine engine and/or aircraft and improving its efficiency (e.g., fuel consumption).

Referring now to the drawings, FIG. 1 is a side view of one embodiment of an aircraft 30. As shown, in several embodiments, the aircraft 30 includes a fuselage 32 and a pair of wings 34 (one is shown) extending outward from the fuselage 32. In the illustrated embodiment, a gas turbine engine 100 is supported on each wing 34 to propel the aircraft through the air during flight. Additionally, as shown, the aircraft 30 includes a vertical stabilizer 36 and a pair of horizontal stabilizers 38 (one is shown). However, in alternative embodiments, the aircraft 30 may include any other suitable configuration, such as any other suitable number or type of engines.

Furthermore, the aircraft 30 may include one or more heat exchangers 200. In general, the heat exchanger(s) 200 transfer heat between two or more fluids (e.g., oil, fuel, and/or the like) supporting the operation of the aircraft 30. As will be described below, one or more heat exchangers 200 may be provided in operative association with each engine 100. However, in alternative embodiments, the heat exchanger(s) 200 may be in operative association with any other suitable component(s) of the aircraft 30.

The configuration of the aircraft 30 described above and shown in FIG. 1 is provided only to place the present subject matter in an exemplary field of use. Thus, the present subject matter may be readily adaptable to any manner of aircraft.

Figure 2:
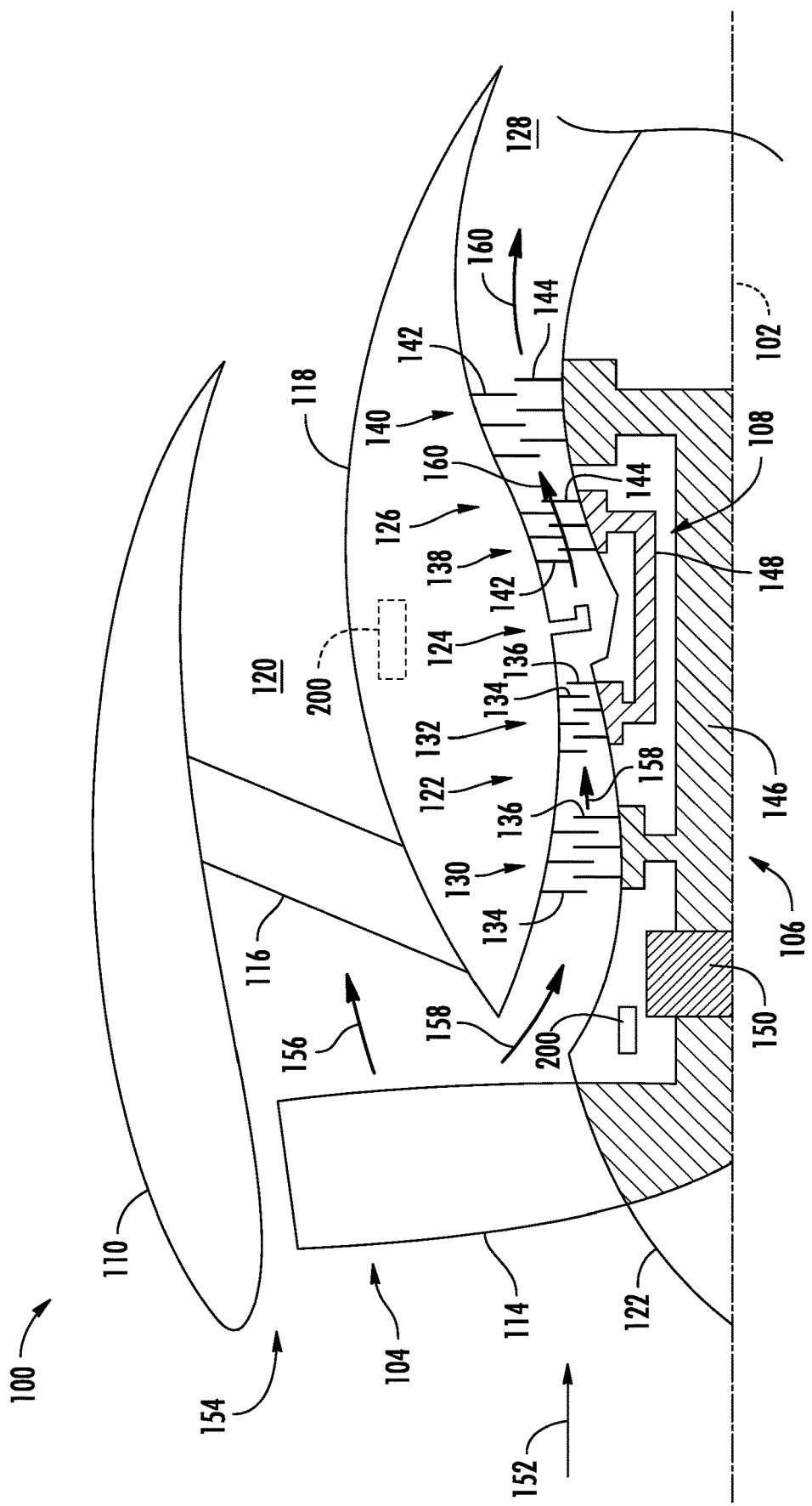
FIG. 2 is a schematic cross-sectional view of one embodiment of a gas turbine engine of an aircraft.

FIG. 2 is a schematic cross-sectional view of one embodiment of a gas turbine engine 100. In the illustrated embodiment, the engine 100 is configured as a high-bypass turbofan engine. However, in alternative embodiments, the engine 100 may be configured as a propfan engine, a turbojet engine, a turboprop engine, a turboshaft gas turbine engine, or any other suitable type of gas turbine engine.

In general, the engine 100 extends along an axial centerline 102 and includes a fan 104, a low-pressure (LP) spool 106, and a high pressure (HP) spool 108 at least partially encased by an annular nacelle 110. More specifically, the fan 104 may include a fan rotor 112 and a plurality of fan blades 114 (one is shown) coupled to the fan rotor 112. In this respect, the fan blades 114 are circumferentially spaced apart and extend radially outward from the fan rotor 112. Moreover, the LP and HP spools 106, 108 are positioned downstream from the fan 104 along the axial centerline 102. As shown, the LP spool 106 is rotatably coupled to the fan rotor 112, thereby permitting the LP spool 106 to rotate the fan 114. Additionally, a plurality of outlet guide vanes or struts 116 circumferentially spaced apart from each other and extend radially between an outer casing 118 surrounding the LP and HP spools 106, 108 and the nacelle 110. As such, the struts 116 support the nacelle 110 relative to the outer casing 118 such that the outer casing 118 and the nacelle 110 define a bypass airflow passage 120 positioned therebetween.

The outer casing 118 generally surrounds or encases, in serial flow order, a compressor section 122, a combustion section 124, a turbine section 126, and an exhaust section 128. For example, in some embodiments, the compressor section 122 may include a low-pressure (LP) compressor 130 of the LP spool 106 and a high-pressure (HP) compressor 132 of the HP spool 108 positioned downstream from the LP compressor 130 along the axial centerline 102. Each compressor 130, 132 may, in turn, include one or more rows of stator vanes 134 interdigitated with one or more rows of compressor rotor blades 136. Moreover, in some embodiments, the turbine section 126 includes a high-pressure (HP) turbine 138 of the HP spool 108 and a low-pressure (LP) turbine 140 of the LP spool 106 positioned downstream from the HP turbine 138 along the axial centerline 102. Each turbine 138, 140 may, in turn, include one or more rows of stator vanes 142 interdigitated with one or more rows of turbine rotor blades 144.

Additionally, the LP spool 106 includes the low-pressure (LP) shaft 146 and the HP spool 108 includes a high pressure (HP) shaft 148 positioned concentrically around the LP shaft 146. In such embodiments, the HP shaft 148 rotatably couples the rotor blades 144 of the HP turbine 138 and the rotor blades 136 of the HP compressor 132 such that rotation of the HP turbine rotor blades 144 rotatably drives HP compressor rotor blades 136. As shown, the LP shaft 146 is directly coupled to the rotor blades 144 of the LP turbine 140 and the rotor blades 136 of the LP compressor 130. Furthermore, the LP shaft 146 is coupled to the fan 104 via a gearbox 150. In this respect, the rotation of the LP turbine rotor blades 144 rotatably drives the LP compressor rotor blades 136 and the fan blades 114.

In several embodiments, the engine 100 may generate thrust to propel an aircraft. More specifically, during operation, air (indicated by arrow 152) enters an inlet portion 154 of the engine 100. The fan 104 supplies a first portion (indicated by arrow 156) of the air 152 to the bypass airflow passage 120 and a second portion (indicated by arrow 158) of the air 152 to the compressor section 122. The second portion 158 of the air 152 first flows through the LP compressor 130 in which the rotor blades 136 therein progressively compress the second portion 158 of the air 152. Next, the second portion 158 of the air 152 flows through the HP compressor 132 in which the rotor blades 136 therein continue progressively compressing the second portion 158 of the air 152. The compressed second portion 158 of the air 152 is subsequently delivered to the combustion section 124. In the combustion section 124, the second portion 158 of the air 152 mixes with fuel and burns to generate high-temperature and high-pressure combustion gases 160. Thereafter, the combustion gases 160 flow through the HP turbine 138 which the HP turbine rotor blades 144 extract a first portion of kinetic and/or thermal energy therefrom. This energy extraction rotates the HP shaft 148, thereby driving the HP compressor 132. The combustion gases 160 then flow through the LP turbine 140 in which the LP turbine rotor blades 144 extract a second portion of kinetic and/or thermal energy therefrom. This energy extraction rotates the LP shaft 146, thereby driving the LP compressor 130 and the fan 104 via the gearbox 150. The combustion gases 160 then exit the engine 100 through the exhaust section 128.

As mentioned above, the aircraft 30 may include one or more heat exchangers 200 for transferring heat between fluids supporting the operation of the aircraft 30. In this respect, a heat exchanger(s) 200 may be positioned within the engine 100. For example, as shown in FIG. 2, in the illustrated embodiment, the engine 100 includes a heat exchanger 200 in operative association with the gearbox 150. In such an embodiment, the heat exchanger 200 may be configured as a fuel-oil heat exchanger that transfers heat from the oil lubricating the gearbox 150 to the fuel supplied to the combustion section 124. However, in alternative embodiments, the heat exchanger(s) 200 may be in operative association with any other suitable component(s) of the engine 100. Moreover, in further embodiments, the engine 100 may include any other suitable number or type of heat exchangers 200.

The configuration of the gas turbine engine 100 described above and shown in FIG. 2 is provided only to place the present subject matter in an exemplary field of use. Thus, the present subject matter may be readily adaptable to any manner of gas turbine engine configuration, including other types of aviation-based gas turbine engines, marine-based gas turbine engines, and/or land-based/industrial gas turbine engines.

Figure 3:
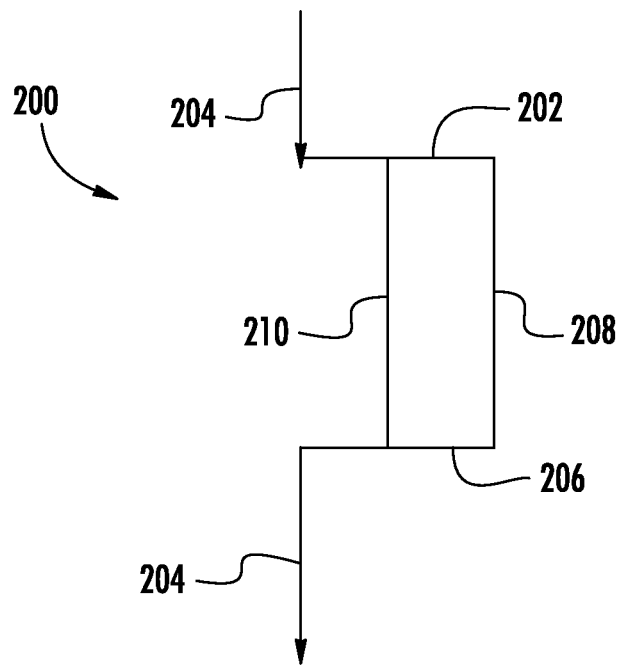
FIG. 3 is a schematic view of one embodiment of a heat exchanger for an aircraft.

FIG. 3 is a schematic view of one embodiment of a heat exchanger 200 for a gas turbine engine and/or an aircraft. In general, the heat exchanger 200 is configured to transfer heat between a first fluid and a second fluid. As shown, the heat exchanger 200 includes an inlet plenum 202 configured to receive a fluid (indicated by arrows 204). Moreover, the heat exchanger 200 includes an outlet plenum 206 configured to discharge the fluid 204 from the heat exchanger 200. Furthermore, the heat exchanger 200 includes a core 208 fluidly coupled to and extending from the inlet and outlet plena 202, 206. As such, the core 208 defines a plurality of fluid passages (FIG. 5) and is configured to transfer heat between two or more fluids flowing therethrough. In this respect, and as will be described below, the heat exchanger 200 includes another inlet plenum and another outlet plenum fluidly coupled together by fluid passages extending through the core 208.

Additionally, the heat exchanger 200 includes a passive bypass flow path 210. Specifically, in several embodiments, the passive bypass flow path 210 is fluidly coupled to and extends between the inlet and outlet plena 202, 206. Moreover, the passive bypass flow path 210 is in parallel with at least a portion of the core 208. As such, during operation of the heat exchanger 200, the fluid 204 enters the inlet plenum 202. A first portion of this fluid 204 flows through the core 208 to the outlet plenum 206, thereby allowing heat to be transferred to or from this portion of the fluid 204. Furthermore, a second portion of the fluid 204 entering the inlet plenum 202 bypasses at least a portion of the core 208 and flows continuously and unobstructed through the passive bypass flow path 210 to the outlet plenum 206. Thus, the passive bypass flow path 210 is completely devoid of valves or other devices that selectively occlude the flow of fluid therethrough.

In general, the passive bypass flow path 210 is larger than the individual fluid passages of the core 208. In this respect, the fluid 204 can flow through the passive bypass flow path 210 at a greater flow rate than though each individual fluid passage of the core 208. Thus, much less heat is transferred to or from the fluid 204 flowing through the passive bypass flow path 210 than the fluid passages of the core 208. For example, the diameter of the passive bypass flow path 210 (or the greatest dimension of its cross-section) may be at least twice as large as each individual fluid passage of the core 208, such as three times as large, four times as large, or five or more times as large.

The passive bypass flow path 210 of the heat exchanger 200 provides one or more technical advantages. More specifically, as mentioned above, conventional heat exchangers are generally oversized to maintain the desired heat transfer rate while keeping the pressure drop under a threshold value. Such an oversized heat exchanger adds weight to the gas turbine engine and/or aircraft in which it is installed. However, the passive bypass flow path 210 allows a portion of the fluid 204 to bypass the core 208 continuously and in an unobstructed manner (i.e., without being controlled by a valve(s)), thereby keeping the pressure drop of the fluid across the heat exchanger 200 under a threshold value while maintaining a sufficient heat transfer rate. Thus, the passive bypass flow path 210 allows the disclosed heat exchanger 210 to be smaller and lighter than conventional heat exchangers, thereby reducing the overall weight of the gas turbine engine 100 and/or aircraft 30 and improving its efficiency (e.g., fuel consumption).

In addition, the heat exchanger 200 may be configured to transfer heat between any suitable fluids. For example, in one embodiment, the heat exchanger 200 may be configured to transfer heat from the oil lubricating a gearbox (e.g., the gearbox 150 of the engine 100) to the fuel supplied to a combustion section of a gas turbine engine (e.g., the combustion section 124 of a gas turbine engine 100). However, in alternative embodiments, the heat exchanger 200 may be configured to transfer heat between any other suitable fluids.

Figure 4:
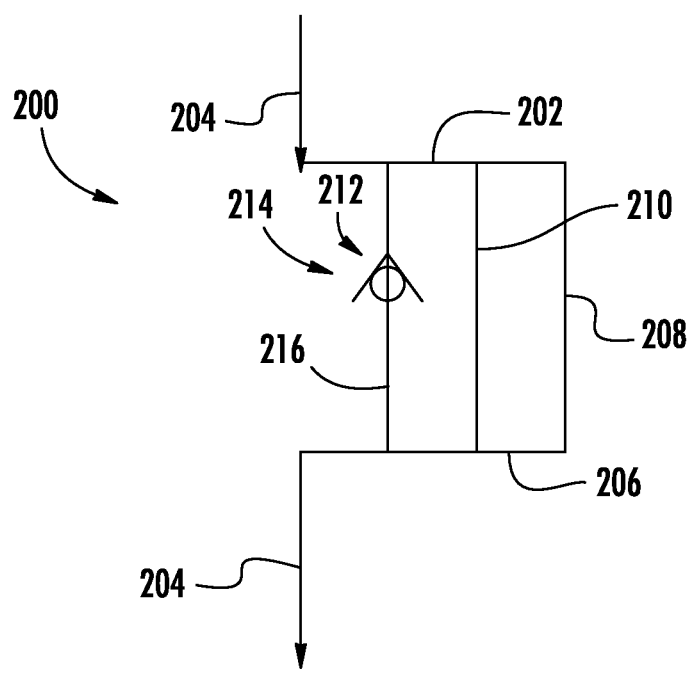
FIG. 4 is a schematic view of another embodiment of a heat exchanger for an aircraft.

FIG. 4 is a schematic view of another embodiment of a heat exchanger 200 for a gas turbine engine and/or an aircraft. Like the embodiment of the heat exchanger 200 shown in FIG. 3, the embodiment of the heat exchanger 200 shown in FIG. 4 includes an inlet plenum 202, an outlet plenum 206, a core 208, and a passive bypass flow path 210. However, unlike the embodiment of the heat exchanger 200 shown in FIG. 3, the embodiment of the heat exchanger 200 shown in FIG. 4 includes a valved bypass 212. More specifically, the valved bypass 212 includes a valve 214 and defines a valve bypass flow path 216 fluidly coupled to and extending from the inlet plenum 202 to the outlet plenum 204. Furthermore, the valved bypass flow path 216 is in parallel with the core 208 and the passive bypass flow path 210. As such, when the valve 214 is at an opened position, a third portion of the fluid 204 bypasses at least a portion of the core 208 and the passive bypass flow path to flow through the valved bypass flow path 210 and to the outlet plenum 206. For example, when a pressure of the fluid 204 within the inlet plenum 202 exceeds a threshold pressure value, the valve 214 may move from a closed position to the opened position, thereby allowing the third portion of the fluid to flow through the valved bypass flow path 210.

Figure 5:
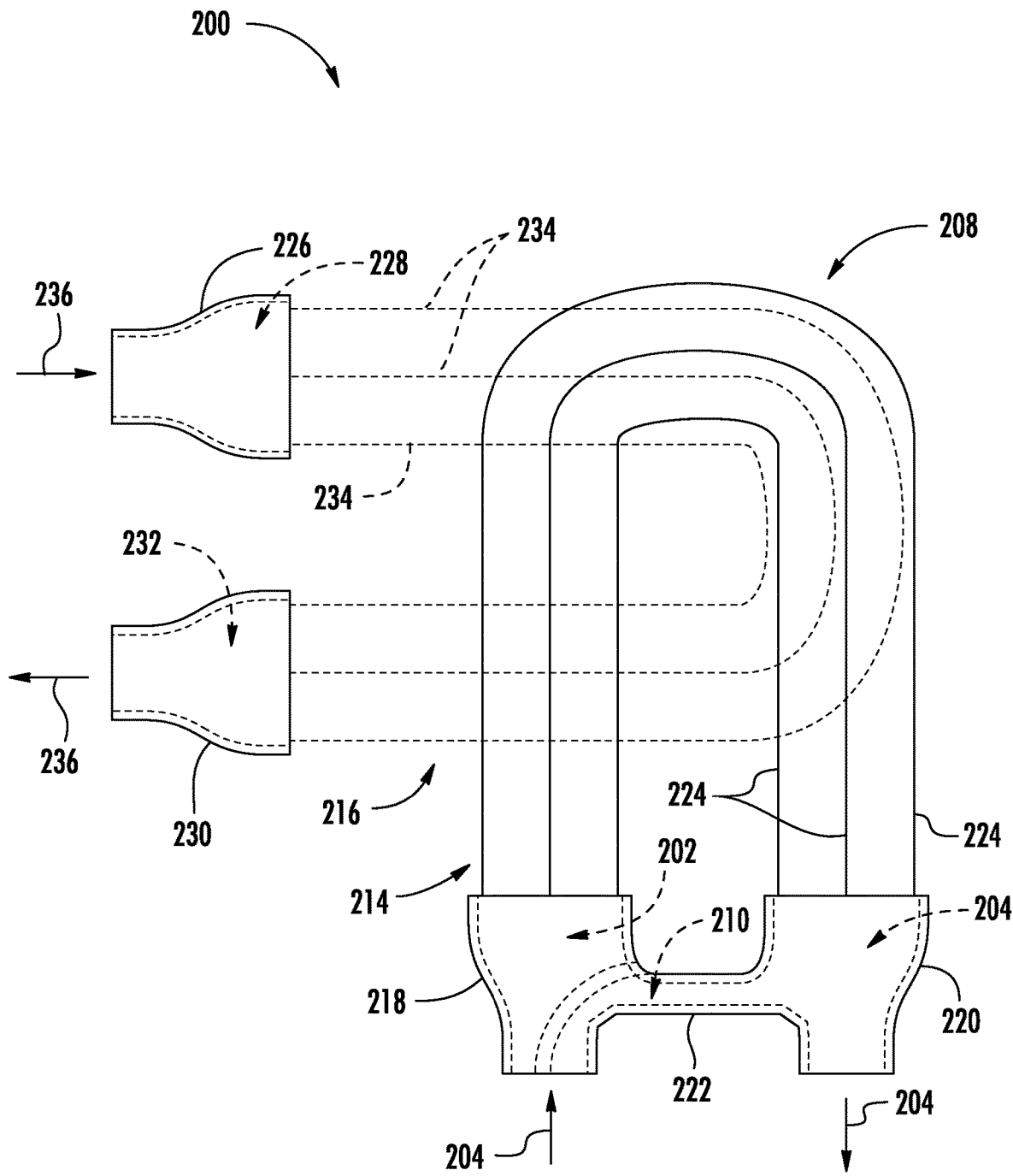
FIG. 5 is a diagrammatic view of one embodiment of a heat exchanger for an aircraft.

FIG. 5 is a diagrammatic view of one embodiment of a heat exchanger 200 for a gas turbine engine and/or an aircraft. As shown, the heat exchanger 200 includes a first fluid circuit 216 and a second fluid circuit 218. More specifically, a first fluid flows through the first fluid circuit 216 and a second fluid flows through the second fluid circuit. In this respect, the heat exchanger 200 allows heat transfer between the first and second fluids. Although FIG. 5 illustrates only two fluid circuits 216, 218, the heat exchanger 200 may, in alternative embodiments, include three or more fluid circuits allowing three or more fluids to flow through the heat exchanger 200.

As shown, the first fluid circuit 214 includes the inlet plenum 202, the outlet plenum 206, and the passive bypass flow path 210. In this respect, the first fluid circuit 214 includes an inlet plenum housing 218 defining the inlet plenum 202 and an outlet plenum housing 220 defining the outlet plenum 206. Furthermore, the first fluid circuit 214 includes a passive bypass 222 defining the passive bypass flow path 210. For example, in the illustrated embodiment, the passive bypass 222 extends between the inlet plenum housing 218 and the outlet plenum housing 220.

Additionally, the first fluid circuit 214 includes a plurality of fluid passages 224 of the core 208. Specifically, the fluid passages 224 extend from the inlet plenum 202 to the outlet plenum 206.

Moreover, the second fluid circuit 216 includes similar components to the first fluid circuit 214. As shown, the second fluid circuit 216 includes an inlet plenum housing 226 defining the inlet plenum 228 and an outlet plenum housing 230 defining the outlet plenum 232. Furthermore, the second fluid circuit 216 includes a plurality of fluid passages 234 of the core 208. Specifically, the fluid passages 234 extend from the inlet plenum 228 to the outlet plenum 232. Additionally, in the illustrated embodiment, the second fluid circuit 216 does not include a passive bypass. However, in alternative embodiments, the second fluid circuit 216 may include a passive bypass.

In operation, the heat exchanger 200 transfers heat between the fluid 204 and another fluid (indicated by arrow 236). More specifically, the fluid 204 enters the inlet plenum 202 of the first fluid circuit 214. A first portion of this fluid 204 flows through the fluid passages 224 of the core 208 to the outlet plenum 206 of the first fluid circuit 214. Simultaneously, the fluid 236 enters the inlet plenum 228 of the second fluid circuit 216. The fluid 236 then flows through the fluid passages 234 of the core 208 to the outlet plenum 206 of the second fluid circuit 216. The fluid passages 224, 234 are near each other to allow heat transfer between the fluids 204, 236. Additionally, as mentioned above, a second portion of the fluid 204 entering the inlet plenum 202 of the first fluid circuit 214 bypasses the core 208 and flows continuously and unobstructed through the passive bypass flow path 210 to the outlet plenum 206.

Figure 6:
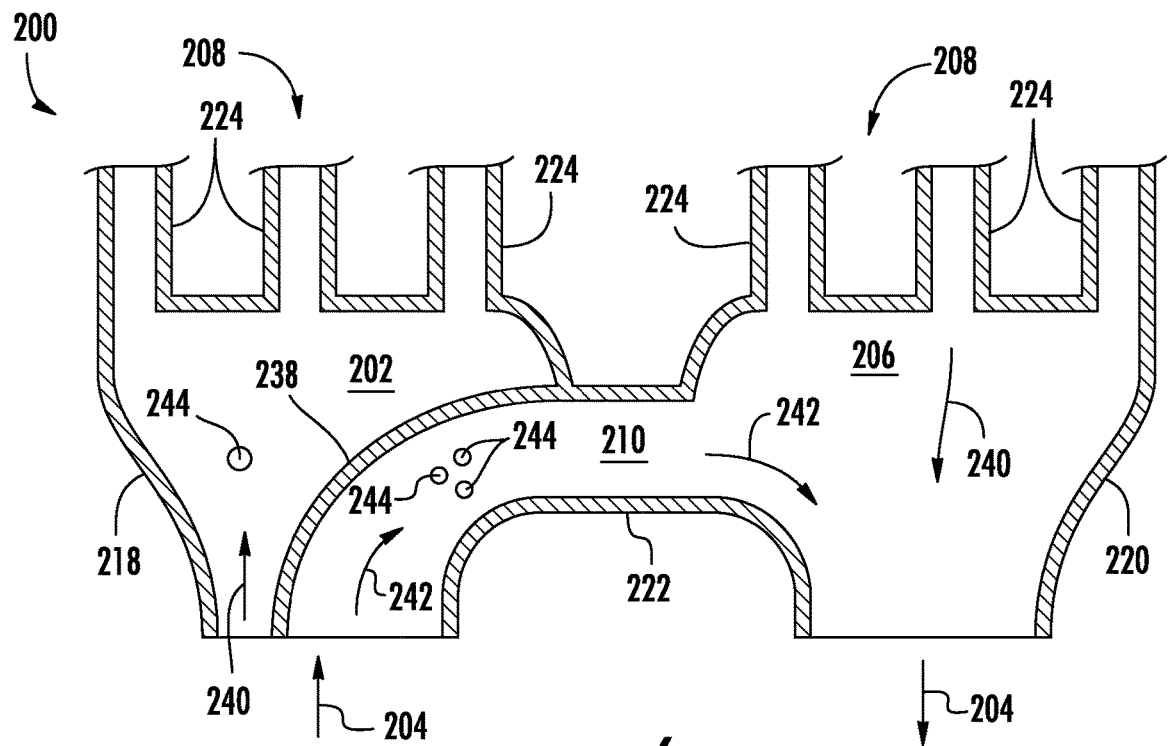
FIG. 6 is a partial cross-sectional view of the heat exchanger shown in FIG. 5, illustrating an inlet plenum and a passive bypass of the heat exchanger.

FIG. 6 is a partial cross-sectional view of the heat exchanger 200, illustrating the inlet plenum 202, the outlet plenum 206, and the passive bypass flow path 210. As shown, the heat exchanger 200 includes a baffle 238 positioned within the inlet plenum 202 such that the baffle 238 partially defines the inlet plenum 202 and partially defines the passive bypass flow path 210. For example, in the illustrated embodiment, the baffle 238 is arcuate. However, in alternative embodiments, the baffle 238 may have any other suitable configuration. In operation, the baffle 238 divides the fluid 204 entering the inlet plenum 202 into a first portion 240 and a second portion 242. The first portion 240 of the fluid 204 flows from the inlet plenum 202 through the fluid passages 224 of the core 208 and into the outlet plenum 206. Conversely, the baffle 238 directs the second portion 242 of the fluid 204 into the passive bypass flow path 210. As such, the second portion 242 of the fluid 204 flows through the passive bypass flow path 210 to the outlet plenum 206, thereby bypassing the core 208. Additionally, the arcuate shape of the baffle 238 imparts a centripetal force on the second portion 242 of the fluid 204 flowing through the passive bypass flow path 210. Such a force directs most of the particulates 244 within the fluid 204 into the passive bypass flow path 210, thereby reducing the likelihood that the particulates 244 occlude a fluid passage(s) 224 of the core 208.

Figures 7, 8:
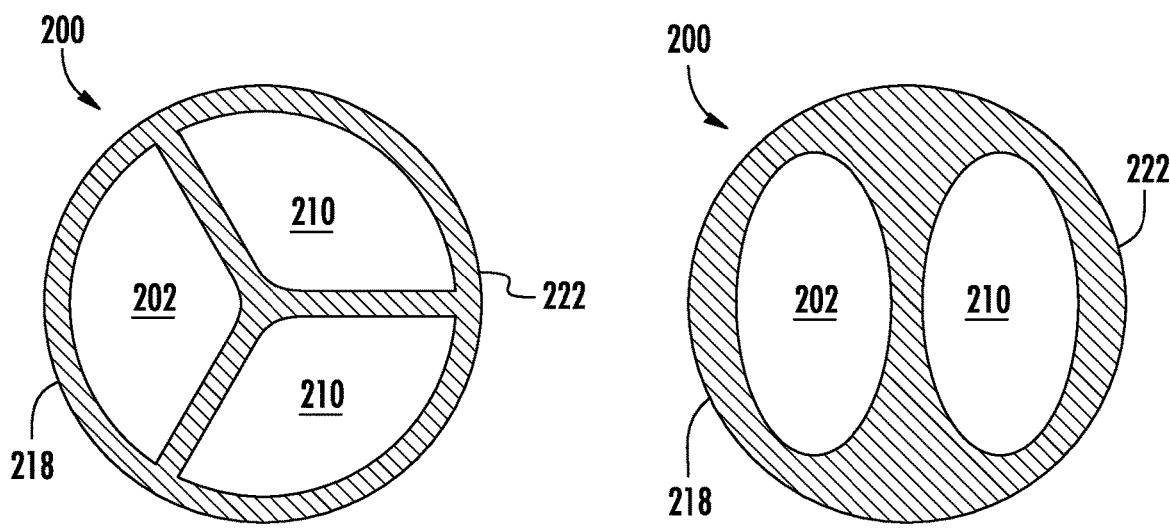
FIG. 7 is another partial cross-sectional view of the heat exchanger shown in FIGS. 5 and 6, illustrating one embodiment of a passive bypass flow path of the passive bypass.
FIG. 8 is a further partial cross-sectional view of the heat exchanger shown in FIGS. 5 and 6, illustrating another embodiment of a passive bypass flow path of the passive bypass.
Figure 9:
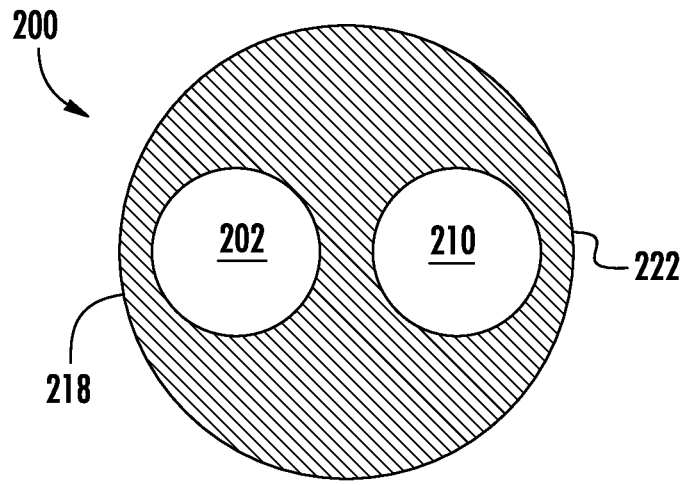
FIG. 9 is yet another partial cross-sectional view of the heat exchanger shown in FIGS. 5 and 6, illustrating a further embodiment of a passive bypass flow path of the passive bypass.

The heat exchanger 200 may have any number of passive bypass flow path 210 and such passive bypass flow path(s) 210 may have any suitable cross-sectional shape. For example, as shown in FIG. 7, in one embodiment, the heat exchanger 200 includes two passive bypass flow paths 210, with such flow paths 210 having a kidney-shaped cross-sectional shape. As shown in FIG. 8, in another embodiment, the heat exchanger 200 includes a single passive bypass flow path 210, with such flow path 210 having an elliptical cross-sectional shape. Moreover, as shown in FIG. 9, in a further embodiment, the heat exchanger 200 includes a single passive bypass flow path 210, with such flow path 210 having a circular cross-sectional shape.

Figure 10:
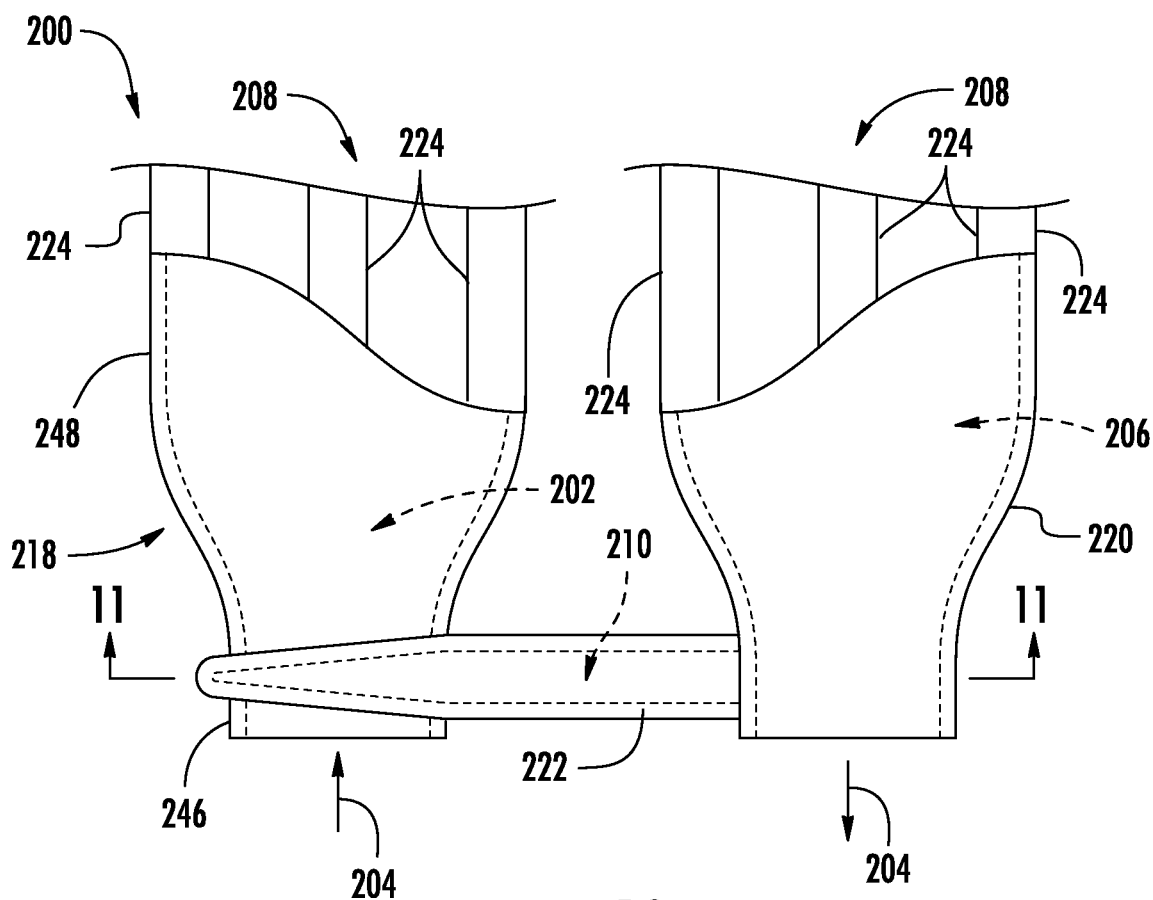
FIG. 10 is a top view of another embodiment of a heat exchanger for an aircraft.
Figure 11:
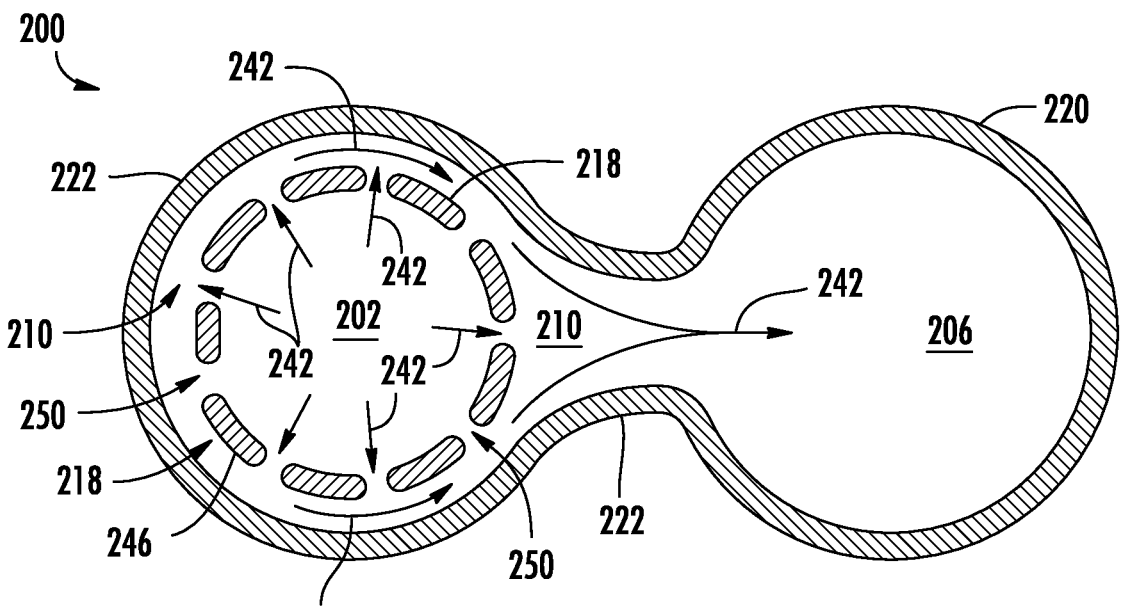
FIG. 11 is a cross-sectional view of the heat exchanger shown in FIG. 10 generally taken about Line 10-10.

FIGS. 10 and 11 illustrate another embodiment of the heat exchanger 200. Specifically, FIG. 10 is a partial top view of the heat exchanger 200. Additionally, FIG. 11 is a cross-sectional view of the heat exchanger 200 generally taken about Line 11-11 in FIG. 10. Like the embodiment of the heat exchanger 200 shown in FIGS. 5 and 6, the embodiment of the heat exchanger 200 shown in FIGS. 10 and 11 includes an inlet plenum housing 218 defining an inlet plenum 202, an outlet plenum housing 220 defining an outlet plenum 206, and a core 208. Moreover, like the embodiment of the heat exchanger 200 shown in FIGS. 5 and 6, the embodiment of the heat exchanger 200 shown in FIGS. 10 and 11 includes a passive bypass 222 extending between the inlet and outlet plenum housings 218, 220, with the passive bypass 222 defining a passive bypass flow path 210 fluidly coupling the inlet and outlet plena 202, 206. Moreover, the passive bypass flow path 210 is in parallel with the core 208.

However, unlike the embodiment of the heat exchanger 200 shown in FIGS. 5 and 6, in the embodiment of the heat exchanger 200 shown in FIGS. 10 and 11, the passive bypass 222 at least partially surrounds the inlet plenum 202 (and the inlet plenum housing 218). More specifically, in such an embodiment, the inlet plenum housing 218 includes a first or narrowed portion 246 and a second portion or enlarged portion 248 positioned downstream of the first portion 246, with the first portion having a smaller diameter than the second portion 248. Furthermore, in some embodiments, the passive bypass 222 at least partially surrounds the first or narrowed portion 246 of the inlet plenum housing 218. Additionally, in such an embodiment, the inlet plenum housing 218 defines a plurality of circumferentially spaced apart bypass inlets 250 fluidly coupling the inlet plenum 202 and the passive bypass flow path 210. As such, the bypass inlets 250 allow the second portion 242 of the fluid 204 to flow radially outward from the inlet plenum 202 into the passive bypass flow path 210. In one embodiment, the bypass inlets 250 are non-uniformly circumferentially spaced apart from each other and are non-uniformly sized to allow the second portion 242 of the fluid 204 to flow into the passive bypass flow path 210 at a uniform rate around its circumference.

Figure 12:
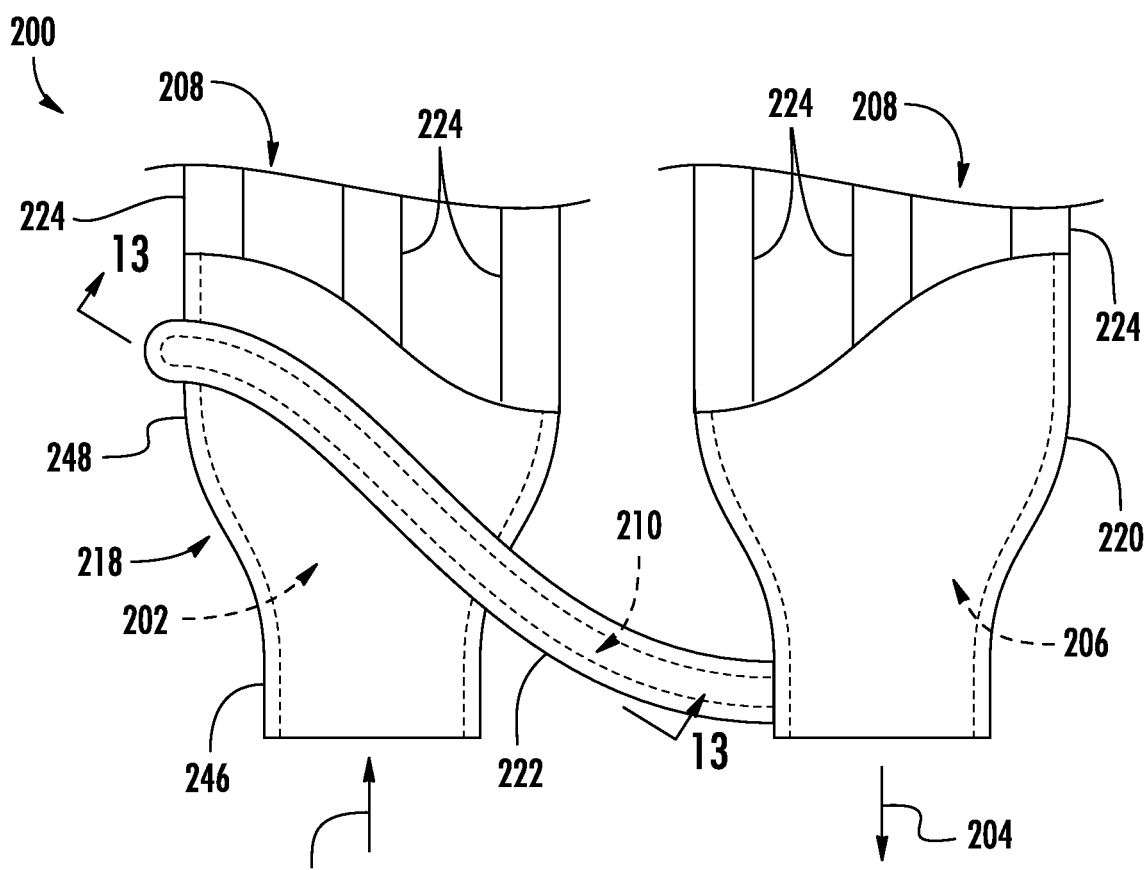
FIG. 12 is a top view of a further embodiment of a heat exchanger for an aircraft.
Figure 13:
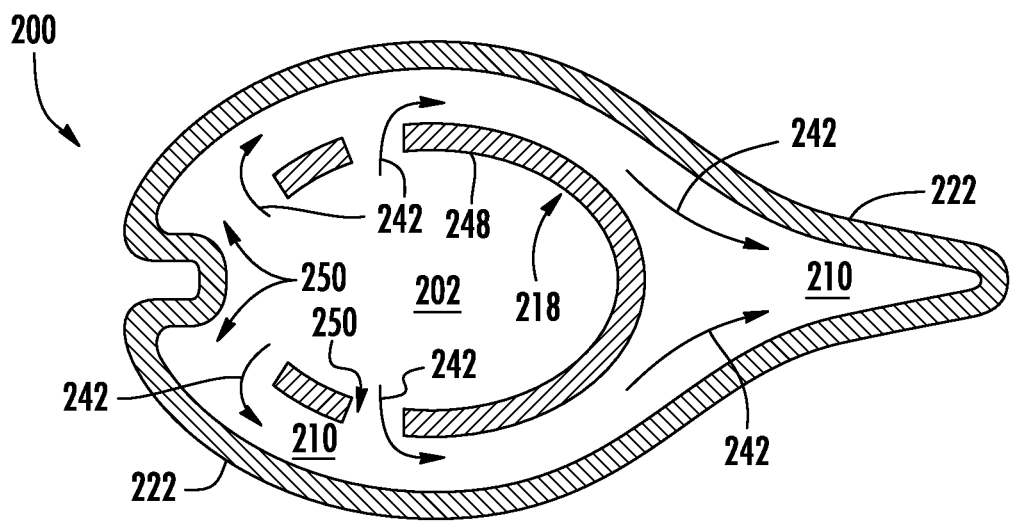
FIG. 13 is a cross-sectional view of the heat exchanger shown in FIG. 12 generally taken about Line 13-13.

FIGS. 12 and 13 illustrate another embodiment of the heat exchanger 200. Specifically, FIG. 12 is a partial top view of the heat exchanger 200. Additionally, FIG. 13 is a cross-sectional view of the heat exchanger 200 generally taken about Line 13-13 in FIG. 12. Like the embodiment of the heat exchanger 200 shown in FIGS. 10 and 11, the embodiment of the heat exchanger 200 shown in FIGS. 12 and 13 includes an inlet plenum housing 218 defining an inlet plenum 202 and having a first or narrowed portion 246 and a second portion or enlarged portion 248 positioned downstream of the first portion 246, with the first portion having a smaller diameter than the second portion 248. Moreover, like the embodiment of the heat exchanger 200 shown in FIGS. 10 and 11, the embodiment of the heat exchanger 200 shown in FIGS. 12 and 13 includes a passive bypass 222 at least partially surrounding the inlet plenum 202 (and the inlet plenum housing 218). However, unlike the embodiment of the heat exchanger 200 shown in FIGS. 10 and 11, in the embodiment of the heat exchanger 200 shown in FIGS. 12 and 13, the passive bypass 222 at least partially surrounds the second or enlarged portion 248 of the inlet plenum 202.

Figure 14:
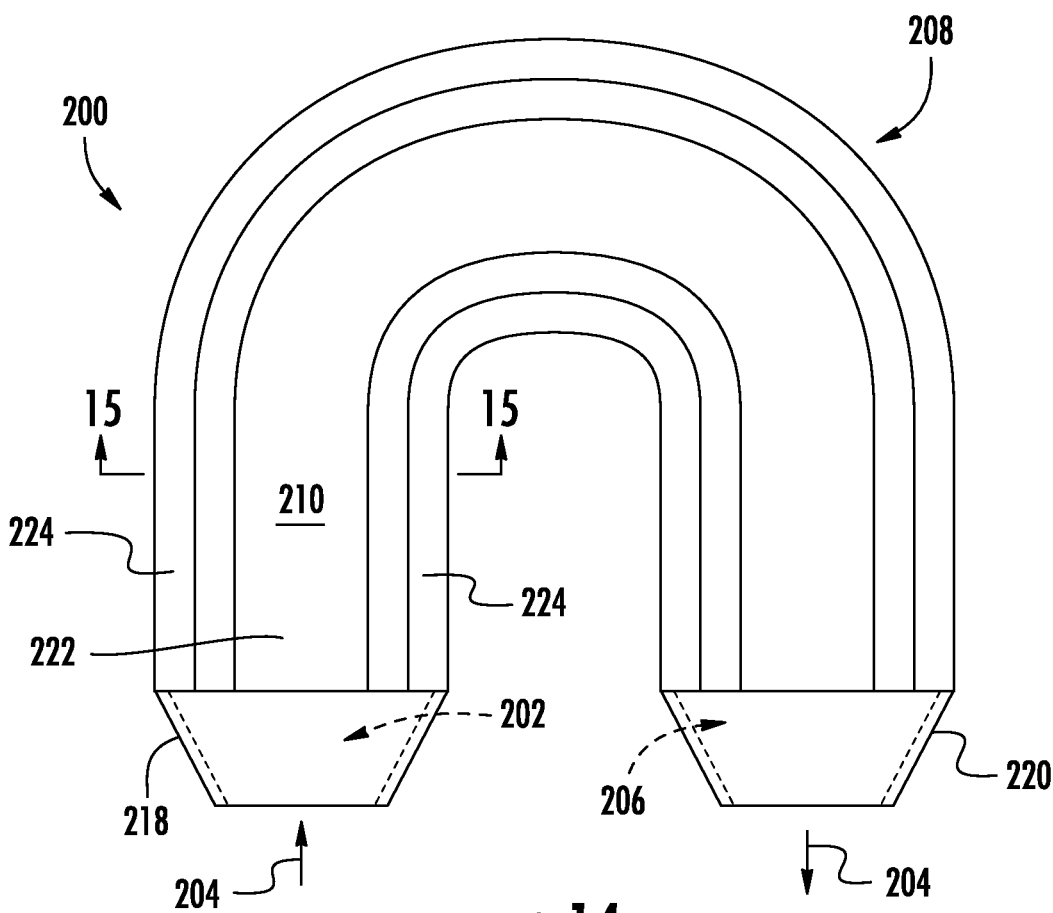
FIG. 14 is a diagrammatic view of yet another embodiment of a heat exchanger for an aircraft.
Figure 15:
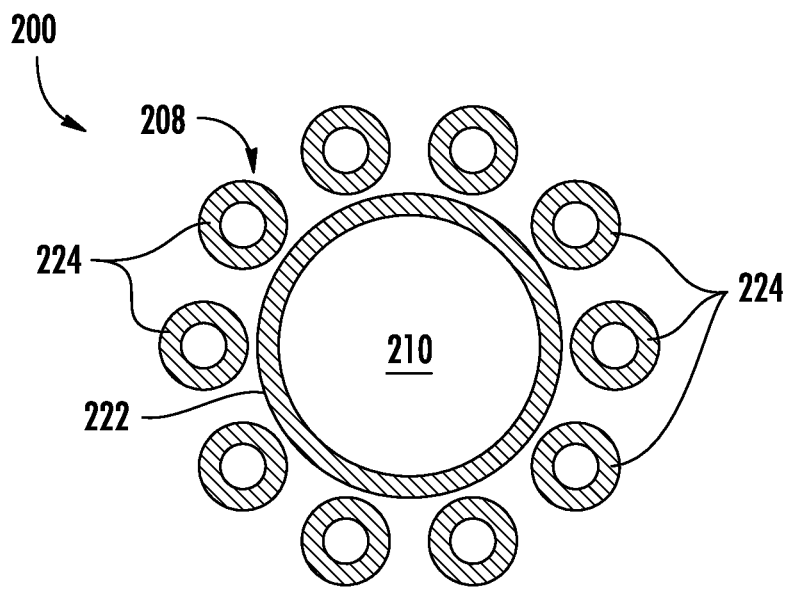
FIG. 15 is a cross-sectional view of the heat exchanger shown in FIG. 14 generally taken about Line 15-15.

FIGS. 14 and 15 illustrate yet another embodiment of the heat exchanger 200. Specifically, FIG. 14 is a partial top view of the heat exchanger 200. Additionally, FIG. 15 is a cross-sectional view of the heat exchanger 200 generally taken about Line 15-15 in FIG. 14. Like the embodiments of the heat exchanger 200 shown in FIGS. 5, 6, and 10-13, the embodiment of the heat exchanger 200 shown in FIGS. 14 and 15 includes an inlet plenum housing 218 defining an inlet plenum 202, an outlet plenum housing 220 defining an outlet plenum 206, and a core 208. Moreover, like the embodiments of the heat exchanger 200 shown in FIGS. 5, 6, and 10-13, the embodiment of the heat exchanger 200 shown in FIGS. 14 and 15 includes a passive bypass 222 extending between the inlet and outlet plenum housings 218, 220, with the passive bypass 222 defining a passive bypass flow path 210 fluidly coupling the inlet and outlet plena 202, 206.

However, unlike the embodiments of the heat exchanger 200 shown in FIGS. 5, 6, and 10-13, in the embodiment of the heat exchanger 200 shown in FIGS. 14 and 15, the passive bypass flow path 210 extends the core 208. Specifically, in the illustrated embodiment, the passive bypass flow path 212 extends centrally through the core 208 such that the fluid passages 224, 234 surround the passive bypass flow path 210. Such positioning of the passive bypass flow path 212 may prevent ice from building up on the core 208 in certain instances.

Figure 16:
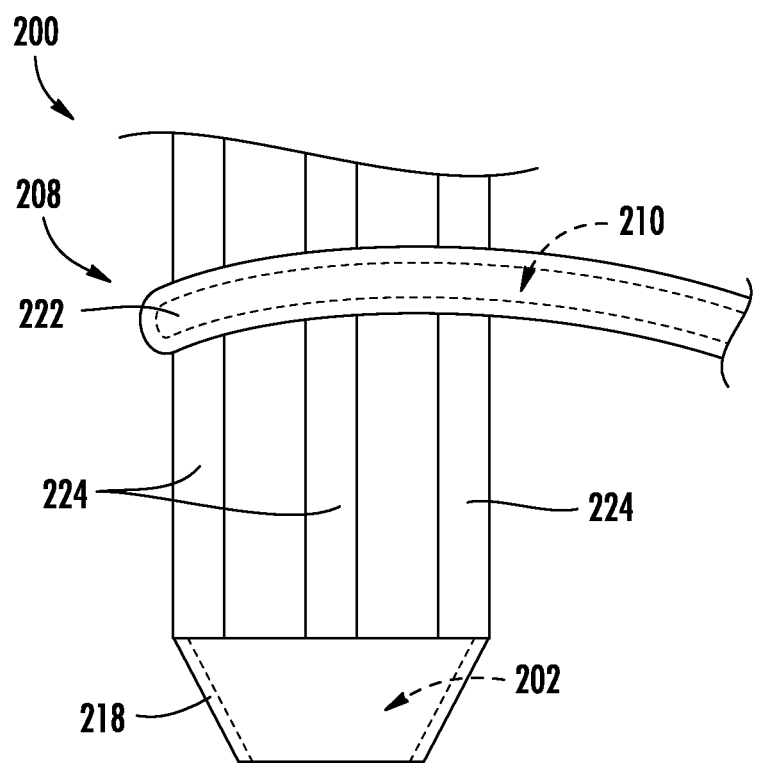
FIG. 16 is a top view of yet a further embodiment of a heat exchanger for an aircraft.

FIG. 16 illustrates another embodiment of the heat exchanger 200. Like the embodiments of the heat exchanger 200 shown in FIGS. 5, 6, and 10-15, the embodiment of the heat exchanger 200 shown in FIG. 16 includes an inlet plenum housing 218 defining an inlet plenum 202, an outlet plenum housing 220 defining an outlet plenum 206, and a core 208. Moreover, like the embodiments of the heat exchanger 200 shown in FIGS. 5, 6, and 10-13, the embodiment of the heat exchanger 200 shown in FIGS. 14 and 15 includes a passive bypass 222 extending between the inlet and outlet plenum housings 218, 220, with the passive bypass 222 defining a passive bypass flow path 210 fluidly coupling the inlet and outlet plena 202, 206.

However, unlike the embodiments of the heat exchanger 200 shown in FIGS. 5, 6, and 10-15, in the embodiment of the heat exchanger 200 shown in FIG. 16, the passive bypass flow path 210 extends from the core 208 to the outlet plenum 206. Specifically, the passive bypass flow path 210 may extend from one or more of the fluid passages 224 of the core 208 to the outlet plenum 206. In this respect, the second portion 242 of the fluid 204 flows through an upstream portion of the core 208 before entering the passive bypass flow path, thereby bypassing a downstream portion of the core 208.

Figure 17:
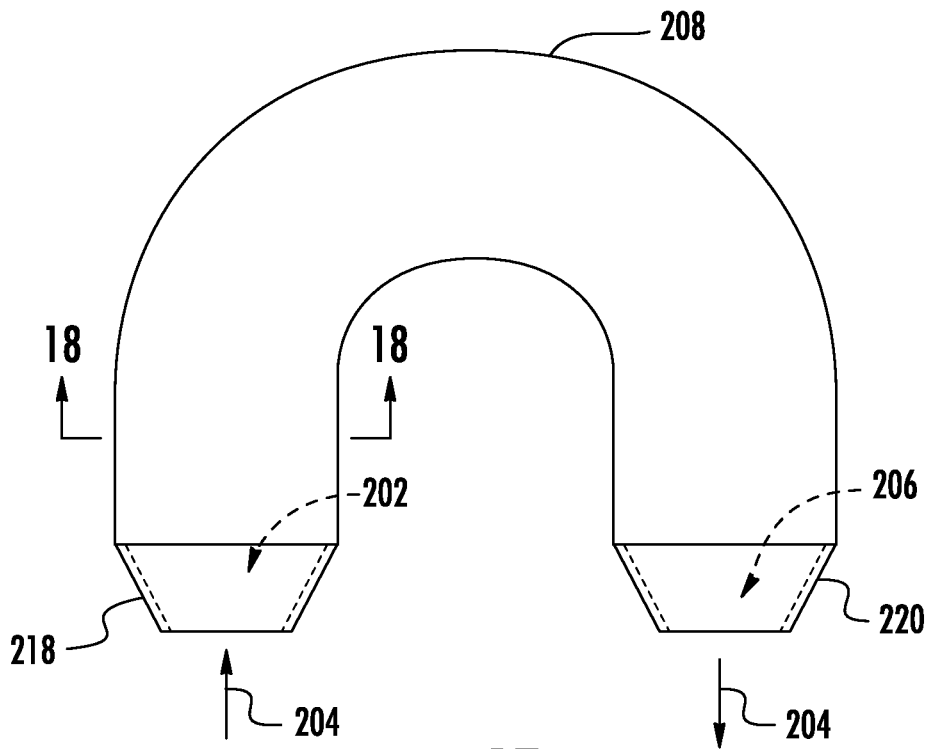
FIG. 17 is a top view of another embodiment of a heat exchanger for an aircraft.
Figure 18:
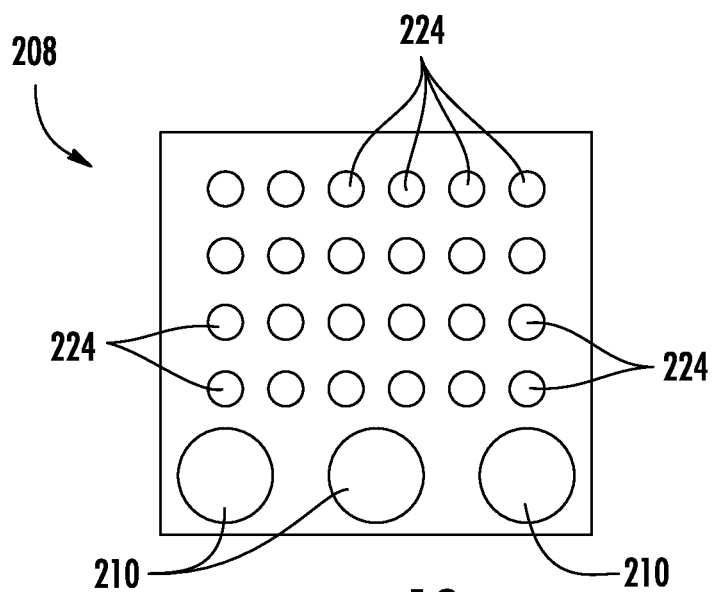
FIG. 18 is a cross-sectional view of the heat exchanger shown in FIG. 17 generally taken about Line 18-18, illustrating one embodiment of a plurality of bypass passage flow paths.
Figure 19:
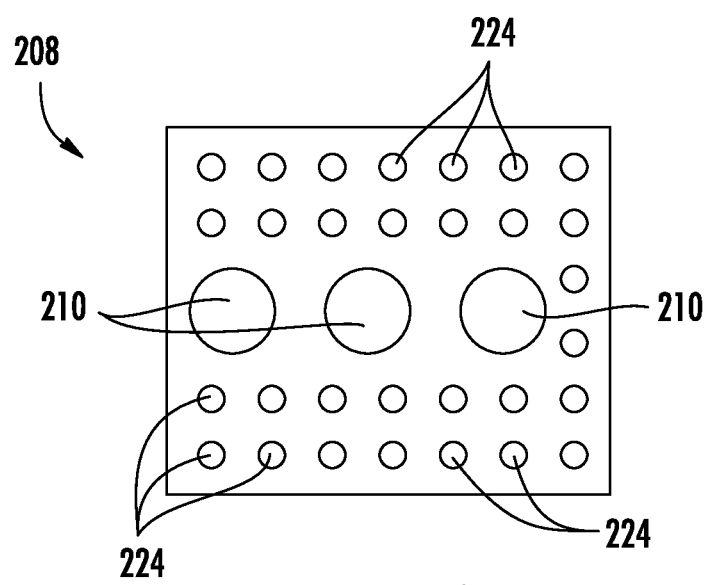
FIG. 19 is a cross-sectional view of the heat exchanger shown in FIG. 17 generally taken about Line 18-18, illustrating another embodiment of a plurality of bypass passage flow paths.

FIGS. 17-19 illustrate a further embodiment of the heat exchanger 200.

Specifically, FIG. 17 is a partial top view of the heat exchanger 200. Moreover, FIG. 18 is a cross-sectional view of the heat exchanger 200 generally taken about Line 18-18 in FIG. 17, illustrating one embodiment of a plurality of bypass passage flow paths 210. Additionally, FIG. 19 is a cross-sectional view of the heat exchanger 200 generally taken about Line 18-18 in FIG. 17, illustrating another embodiment of a plurality of bypass passage flow paths 210. Like the embodiment of the heat exchanger 200 shown in FIGS. 14 and 15, the embodiment of the heat exchanger 200 shown in FIGS. 16-19 includes an inlet plenum housing 218 defining an inlet plenum 202, an outlet plenum housing 220 defining an outlet plenum 206, and a core 208. Moreover, like the embodiment of the heat exchanger 200 shown in FIGS. 14 and 15, the embodiment of the heat exchanger 200 shown in FIGS. 16-19 includes a passive bypass flow path 210 extending through the core 208 between the inlet and outlet plenum housings 218, 220.

However, unlike the embodiment of the heat exchanger 200 shown in FIGS. 14 and 15, in the embodiment of the heat exchanger 200 shown in FIG. 18, three passive bypass flow paths 210 are positioned adjacent to the exterior of the core 208. That is, the three passive bypass flow paths 210 are positioned between the fluid passages 224 and the exterior of the core 208.

Additionally, in the embodiment of the heat exchanger 200 shown in FIG. 19, three passive bypass flow paths 210 are positioned centrally within the core 208, but only partially surrounded by the fluid passages 224. However, in alternative embodiments, the heat exchanger 200 may define more or fewer passive bypass flow paths 210.

The FIGS. illustrate only certain numbers (e.g., two or three) of fluid passages 224, 234 through the core 208 for purposes of clarity. However, the core 208 may define any suitable number of fluid passages 224, 234, such as fifty fluid passages 224, 234; one hundred fluid passages 224, 234; or more fluid passages 224, 234.

Additionally, in several embodiment, the heat exchanger 200 may be integrally formed as a single monolithic component, such as via a suitable additive printing or manufacturing process. However, in alternative embodiments, the heat exchanger 200 may be formed as any suitable number of component that are assembled together and/or via any of suitable manufacturing process.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

Further aspects of the invention are provided by the subject matter of the following clauses:

A heat exchanger for an aircraft, the heat exchanger comprising: an inlet plenum housing defining an inlet plenum configured to receive a fluid; an outlet plenum housing defining an outlet plenum configured to discharge the fluid from the heat exchanger; a core configured to heat or cool a first portion of the fluid, the core defining a plurality of fluid passages fluidly coupled to and extending from the inlet plenum to the outlet plenum; and a passive bypass defining a passive bypass flow path fluidly coupled to and extending between the inlet plenum and the outlet plenum, the passive bypass flow path being in parallel with at least a portion of the core such that a second portion of the fluid bypasses at least a portion of the core and flows continuously and unobstructed through the passive bypass flow path to the outlet plenum.

The heat exchanger of one or more of these claim clauses, further comprising: a valved bypass including a valve and defining a valve bypass flow path fluidly coupled to and extending from the inlet plenum to the outlet plenum, the valved bypass flow path being in parallel with the core and the passive bypass flow path such that, when the valve is at an opened position, a third portion of the fluid bypasses at least a portion of the core and flows through the valved bypass flow path to the outlet plenum.

The heat exchanger of one or more of these claim clauses, wherein, when a pressure of the fluid within the inlet plenum exceeds a threshold pressure value, the valve moves from a closed position to the opened position.

The heat exchanger of one or more of these claim clauses, further comprising: a baffle positioned within the inlet plenum and partially defining the passive bypass flow path such that the baffle splits the fluid entering the inlet plenum into the first and second portions.

The heat exchanger of one or more of these claim clauses, wherein the baffle has an arcuate shape.

The heat exchanger of one or more of these claim clauses, wherein the passive bypass flow path has at least one of a kidney-shaped cross-sectional shape, an elliptical cross-sectional shape, or a circular cross-sectional shape.

The heat exchanger of one or more of these claim clauses, wherein a portion of the passive bypass surrounds the inlet plenum such that the second portion of the fluid flows radially outward from the inlet plenum into the passive bypass flow path.

The heat exchanger of one or more of these claim clauses, wherein the inlet plenum housing defines a plurality of circumferentially spaced apart bypass inlets fluidly coupling the inlet plenum and the passive bypass flow path.

The heat exchanger of one or more of these claim clauses, wherein the bypass inlets are non-uniformly circumferentially spaced apart from each other.

The heat exchanger of one or more of these claim clauses, wherein the inlet plenum includes a first portion and a second portion positioned downstream of the first portion, the first portion having a smaller diameter than the second portion, the passive bypass surrounding the first portion of the inlet plenum.

The heat exchanger of one or more of these claim clauses, wherein the inlet plenum includes a first portion and a second portion positioned downstream of the first portion, the first portion having a smaller diameter than the second portion, the passive bypass surrounding the second portion of the inlet plenum.

The heat exchanger of one or more of these claim clauses, wherein the passive bypass flow path extends through the core.

The heat exchanger of one or more of these claim clauses, wherein the passive bypass flow path extends centrally through the core such that the plurality of fluid passages surrounds the passive bypass flow path.

The heat exchanger of one or more of these claim clauses, wherein the passive bypass path is positioned between the plurality of fluid passages and an exterior of the core.

The heat exchanger of one or more of these claim clauses, wherein the passive bypass flow path comprises a plurality of passive bypass flow paths extending through the core.

The heat exchanger of one or more of these claim clauses, wherein the passive bypass extends from the core to the outlet plenum housing such that the second portion of fluid flows from the core through the passive bypass flow path to the outlet plenum.

The heat exchanger of one or more of these claim clauses, wherein the heat exchanger is integrally formed.

A gas turbine engine, comprising: a compressor; a combustor; a turbine; a heat exchanger in operative association with at least one of the compressor, the combustor, or the turbine, the heat exchanger comprising: an inlet plenum housing defining an inlet plenum configured to receive a fluid; an outlet plenum housing defining an outlet plenum configured to discharge the fluid from the heat exchanger; a core configured to heat or cool a first portion of the fluid, the core defining a plurality of fluid passages fluidly coupled to and extending from the inlet plenum to the outlet plenum; and a passive bypass defining a passive bypass flow path fluidly coupled to and extending between the inlet plenum and the outlet plenum, the passive bypass flow path being in parallel with at least a portion of the core such that a second portion of the fluid bypasses at least a portion of the core and flows continuously and unobstructed through the passive bypass flow path to the outlet plenum.

The gas turbine engine of one or more of these claim clauses, further comprising: a valved bypass including a valve and defining a valve bypass flow path fluidly coupled to and extending from the inlet plenum to the outlet plenum, the valved bypass flow path being in parallel with the core and the passive bypass flow path such that, when the valve is at an opened position, a third portion of the fluid bypasses at least a portion of the core and flows through the valved bypass flow path to the outlet plenum.

The gas turbine engine of one or more of these claim clauses, wherein, when a pressure of the fluid within the inlet plenum exceeds a threshold pressure value, the valve moves from a closed position to the opened position.

What is claimed is:

1. A heat exchanger of a gas turbine engine, the heat exchanger comprising:
    an inlet plenum housing defining an inlet plenum configured to receive a fluid;
    an outlet plenum housing defining an outlet plenum configured to discharge the fluid from the heat exchanger;
    a core configured to heat or cool a first portion of the fluid, the core defining a plurality of fluid passages fluidly coupled to and extending from the inlet plenum to the outlet plenum;
    a passive bypass defining a passive bypass flow path fluidly coupled to and extending between the inlet plenum and the outlet plenum, the passive bypass flow path being in parallel with at least a portion of the core such that a second portion of the fluid bypasses at least a portion of the core and flows continuously and unobstructed through the passive bypass flow path to the outlet plenum; and
    a baffle partially defining the passive bypass flow path;
    wherein the outlet plenum and the inlet plenum are positioned adjacent one another, such that the inlet plenum, the outlet plenum, and the passive bypass share a common wall, and the baffle, the passive bypass, and the inlet plenum each extend from an upstream inlet cross-section of the inlet plenum housing.

2. The heat exchanger of claim 1, further comprising:
    a valved bypass including a valve and defining a valved bypass flow path fluidly coupled to and extending from the inlet plenum to the outlet plenum, the valved bypass flow path being in parallel with the core and the passive bypass flow path such that, when the valve is at an opened position, a third portion of the fluid bypasses at least a portion of the core and flows through the valved bypass flow path to the outlet plenum.

3. The heat exchanger of claim 2, wherein, when a pressure of the fluid within the inlet plenum exceeds a threshold pressure value, the valve moves from a closed position to the opened position.

4. The heat exchanger of claim 1, wherein
    the baffle splits the fluid entering the inlet plenum into the first and second portion.

5. The heat exchanger of claim 4, wherein the baffle has an arcuate shape.

6. The heat exchanger of claim 5, wherein the passive bypass flow path has at least one of a kidney-shaped cross-sectional shape, an elliptical cross-sectional shape, or a circular cross-sectional shape.

7. The heat exchanger of claim 1, wherein the heat exchanger is integrally formed.

8. The heat exchanger of claim 1,
    wherein a diameter of the passive bypass flow path is larger than a diameter of the plurality of fluid passages, such that the second portion of the fluid that flows through the passive bypass flow path has a greater flow rate than a flow rate through each individual fluid passage of the plurality of fluid passages carrying the first portion of the fluid that flows through the core.

9. A gas turbine engine, comprising:
    a compressor;
    a combustor;
    a turbine;
    a heat exchanger in operative association with at least one of the compressor, the combustor, or the turbine, the heat exchanger comprising:
        an inlet plenum housing defining an inlet plenum configured to receive a fluid;
        an outlet plenum housing defining an outlet plenum configured to discharge the fluid from the heat exchanger;
        a core configured to heat or cool a first portion of the fluid, the core defining a plurality of fluid passages fluidly coupled to and extending from the inlet plenum to the outlet plenum;
        a passive bypass defining a passive bypass flow path fluidly coupled to and extending between the inlet plenum and the outlet plenum, the passive bypass flow path being in parallel with at least a portion of the core such that a second portion of the fluid bypasses at least a portion of the core and flows continuously and unobstructed through the passive bypass flow path to the outlet plenum; and a baffle partially defining the passive bypass flow path; wherein the outlet plenum and the inlet plenum are positioned adjacent one another, such that the inlet plenum, the outlet plenum, and the passive bypass share a common wall, and the baffle, the passive bypass, and the inlet plenum each extend from an upstream inlet cross-section of the inlet plenum housing.

10. The gas turbine engine of claim 9, further comprising:

a valved bypass including a valve and defining a valved bypass flow path fluidly coupled to and extending from the inlet plenum to the outlet plenum, the valved bypass flow path being in parallel with the core and the passive bypass flow path such that, when the valve is at an opened position, a third portion of the fluid bypasses at least a portion of the core and flows through the valved bypass flow path to the outlet plenum.

11. The gas turbine engine of claim 10, wherein, when a pressure of the fluid within the inlet plenum exceeds a threshold pressure value, the valve moves from a closed position to the opened position.

* * * * *